United States Patent
Reis

(10) Patent No.: US 6,804,104 B2
(45) Date of Patent: Oct. 12, 2004

(54) DATA CARRIER COMPRISING AN INTEGRATED CIRCUIT WITH AN INTEGRATED MAIN CAPACITOR AND INTEGRATED ADDITIONAL CAPACITORS

(75) Inventor: Kuno Reis, Frohnleiten (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 218 days.

(21) Appl. No.: 10/131,994

(22) Filed: Apr. 25, 2002

(65) Prior Publication Data

US 2002/0182912 A1 Dec. 5, 2002

(30) Foreign Application Priority Data

Apr. 26, 2001 (EP) ............................................ 01890123

(51) Int. Cl.⁷ ................................................ H01C 7/12
(52) U.S. Cl. ...................................... 361/119; 361/118
(58) Field of Search ............................... 361/118, 821, 361/782, 119

(56) References Cited

U.S. PATENT DOCUMENTS 6,404,644 B1 * 6/2002 Ikefuji et al. ............... 361/737

FOREIGN PATENT DOCUMENTS

WO WO9840846 2/1998 .......... G06K/19/07

* cited by examiner

Primary Examiner—Hung V. Ngo
(74) Attorney, Agent, or Firm—Kevin Simons

(57) ABSTRACT

A data carrier (1) comprises an integrated circuit (3), which integrated circuit (3) comprises a tolerance-defined main capacitor (35) which is connected to a coil (4) of the data carrier (1), and which integrated circuit (3) comprises at least one integrated additional capacitor (32) which is optionally connectable to the coil (4) of the data carrier (1) so that a parallel switching configuration of the main capacitor (35) with the at least one additional capacitor (32) is achievable. The optional parallel arrangement of the at least one additional capacitor (32) leads to a reduction of the tolerance range of the nominal capacitance of the main capacitor (35) when the effectively realized capacitance of the main capacitor (35) is reduced by a factor F and the at least one additional capacitor (32) has a fraction K of the nominal capacitance of the main capacitor (35).

9 Claims, 1 Drawing Sheet

Figure 1:
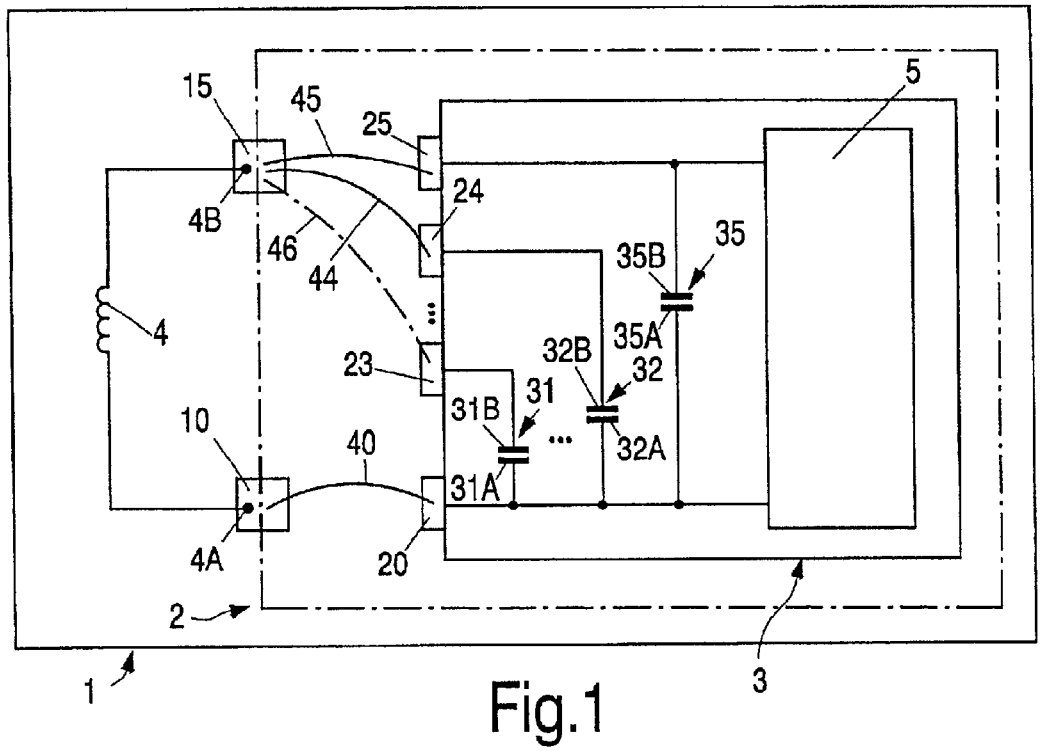

DATA CARRIER COMPRISING AN INTEGRATED CIRCUIT WITH AN INTEGRATED MAIN CAPACITOR AND INTEGRATED ADDITIONAL CAPACITORS

The invention relates to a data carrier comprising a coil with two coil terminals and an integrated circuit, said integrated circuit comprising an integrated main capacitor which is connected to two contacts of the integrated circuit, each contact of said two contacts being connected in an electrically conducting manner to a coil terminal via an electrically conducting connection.

The invention also relates to a module comprising coil terminals to which a coil is connectable, which module comprises an integrated circuit, said integrated circuit comprising an integrated main capacitor which is connected to two contacts of the integrated circuit, each contact of said two contacts being connected in an electrically conducting manner to a coil terminal via an electrically conducting connection.

The invention further relates to an integrated circuit for a data carrier comprising a coil with two coil terminals and an integrated circuit, said integrated circuit comprising an integrated main capacitor which is connected to two contacts of the integrated circuit, said contacts being connectable in an electrically conducting manner to the two coil terminals.

Such a data carrier as described in the opening paragraph, such a module as described in the second paragraph and such an integrated circuit as described in the third paragraph are marketed by the applicant and are therefore known. In the known embodiments, the value of the integrated main capacitor which, together with a coil, is provided to form a resonant circuit for contactless communication with a communication system, is in a more or less large range of tolerances. The tolerance range of the integrated main capacitor results from manufacture-related aspects and plays a very important role in the system behavior and the efficiency of a data carrier during communication, because the efficiency is severely affected at a resonance frequency deviating from a desired nominal resonance frequency of the resonant circuit constituted by the main capacitor and the coil. This deterioration of the efficiency is a drawback. A possible measure of obviating this problem is the separation or selection of integrated circuits for a data carrier whose resonance capacitance does not have a desired capacitance of the integrated main capacitor, which, however, leads to a reduced output, which is a drawback and therefore undesirable.

It is an object of the invention to eliminate the above-mentioned drawbacks and to provide an improved data carrier, an improved module and an improved integrated circuit for a data carrier.

To solve the object mentioned above, a data carrier as described in the opening paragraph can be characterized as follows.

A data carrier comprising a coil with two coil terminals and an integrated circuit, said integrated circuit comprising an integrated main capacitor which is connected to two contacts of the integrated circuit, each contact of said two contacts being connected in an electrically conducting manner to a coil terminal via an electrically conducting connection, the integrated circuit also comprising at least one integrated additional capacitor which is connected to at least one additional contact of the integrated circuit, each additional contact of said at least one additional contact being connected in an electrically conducting manner to a coil terminal via an electrically conducting connection.

To solve the object stated above, a module of the type described in the second paragraph can be characterized as follows.

A module comprising coil terminals to which a coil is connectable, which module comprises an integrated circuit, said integrated circuit comprising an integrated main capacitor which is connected to two contacts of the integrated circuit, each contact of said two contacts being connected in an electrically conducting manner to a coil terminal via an electrically conducting connection, the integrated circuit also comprising at least one integrated additional capacitor which is connected to at least one additional contact of the integrated circuit, each additional contact of said at least one additional contact being connected in an electrically conducting manner to a coil terminal via an electrically conducting connection.

To solve the above-mentioned object, an integrated circuit as described in the third paragraph can be characterized as follows.

An integrated circuit for a data carrier comprising a coil with two coil terminals and an integrated circuit, said integrated circuit comprising an integrated main capacitor which is connected to two contacts of the integrated circuit, each contact of said two contacts being connected in an electrically conducting manner to a coil terminal via an electrically conducting connection, the integrated circuit also comprising at least one integrated additional capacitor which is connected to at least one additional contact of the integrated circuit, each additional contact of said at least one additional contact being connectable in an electrically conducting manner to a coil terminal via an electrically conducting connection.

By virtue of the characteristic features of the invention, it is achieved in a relatively simple way that the tolerance range of the capacitance of the integrated resonance capacitor can be restricted so that the resonance frequency determined by this capacitance is always very near a desired nominal value.

In the embodiments according to the invention, it has been proved to be advantageous when the characteristic features as defined in claims 2, 5 and 8, respectively, are additionally provided. In this way, a very accurate and fine-tuned determination of the capacitance of the integrated main capacitor proximate to the desired nominal value is possible.

In the embodiments according to the invention, it has further proved to be very advantageous when the characteristic features as defined in claims 3, 6 and 9, respectively, are additionally provided. In this way, it is achieved that a minimal number of additional contacts is sufficient.

These and other aspects of the invention are apparent from and will be elucidated with reference to the embodiments described hereinafter.

Figure 2:
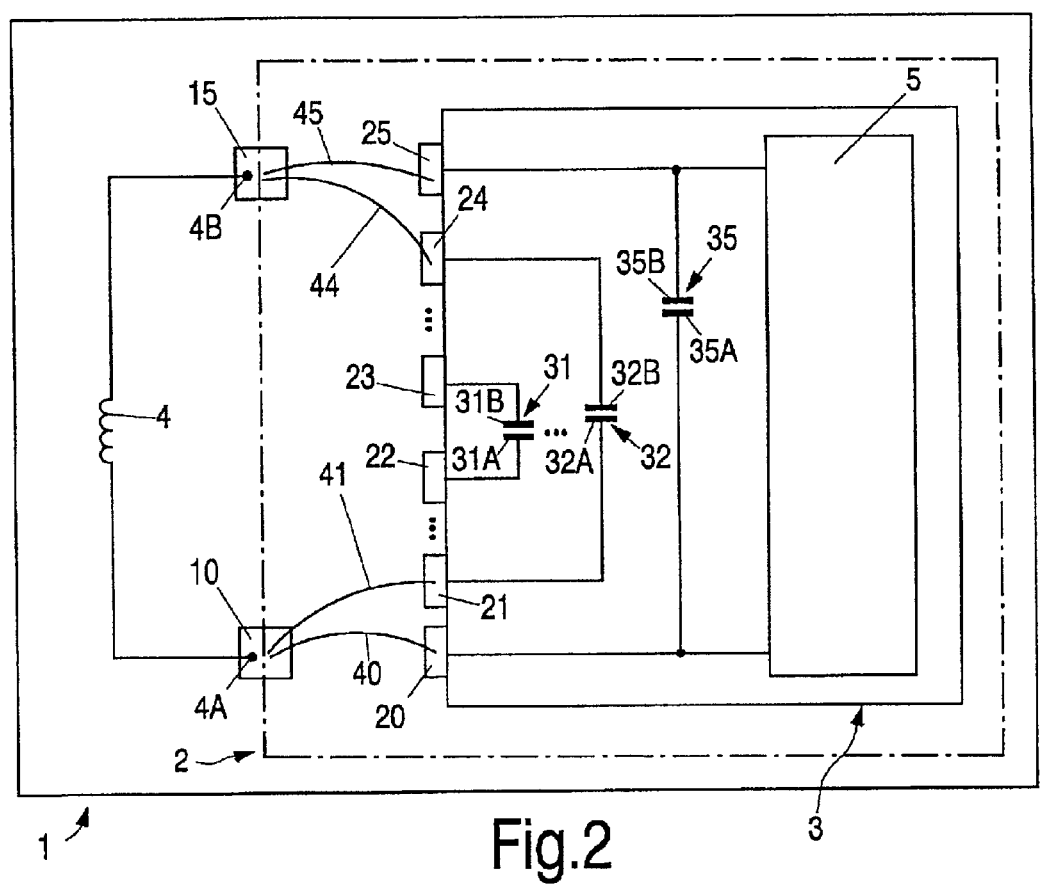

In the drawings:

FIG. 1 is a block diagram of an essential part of a data carrier in accordance with an embodiment of the invention, FIG. 2 shows, analogously to FIG. 1, a part of a data carrier in accordance with a second embodiment of the invention.

FIG. 1 shows a data carrier 1. The data carrier 1 is formed for contactless communication with a communication station, which is not shown in FIG. 1, because it is not essential for describing the invention. The data carrier 1 includes a coil 4 having two terminals 4A and 4B and with which communication with a communication system can be established in an inductive manner.

The data carrier 1 further includes a module 2. The module 2 comprises two terminals 10 and 15 to which the terminals 4A and 4B of the coil 4 are connected. The module 2 further includes an integrated circuit 3. The integrated circuit 3 comprises a first contact 20 which is connected in an electrically conducting manner to the first module terminal 10 of the module 2 via an electrically conducting connection 40. The integrated circuit further comprises a second contact 25 which is connected in an electrically conducting manner to the second terminal 15 of the module 2 via an electrically conducting connection 45. The integrated circuit 3 further comprises processing means 5 which are connected to the two contacts 20 and 25 of the integrated circuit 3 and comprises all essential means required for communication with a communication system.

In the integrated circuit 3, an integrated main capacitor 35 is arranged parallel to the two contacts 20 and 25 of the integrated circuit 3, which integrated main capacitor 35 is directly connected in an electrically conducting manner to one of the two contacts 20 and 25 via each of its two electrodes 35A and 35B. Together with the coil 4, the integrated main capacitor 35 constitutes a parallel resonant circuit whose resonance frequency should correspond to the frequency $f_0$ of a communication signal which occurs during communication with the communication station (not shown). Since the capacitance of the integrated main capacitor 35 is subject to a manufacture-defined tolerance, the resonance frequency of the parallel resonant circuit is likewise tolerance-defined, which is a drawback and therefore undesirable.

Advantageously, the integrated circuit 3 comprises a plurality of integrated additional capacitors, of which only a first additional capacitor 32 and a last additional capacitor 31 are shown in FIG. 1. For each additional capacitor 31, 32, only one additional contact 23, 24 is provided in this case. A first electrode 31B, 32B of each additional capacitor 31, 32 is connected in an electrically conducting manner to an additional contact 23, 24, respectively. A second electrode 31A, 32A of each additional capacitor 31, 32 is connected internally in the integrated circuit 3 to the integrated main capacitor 35, in this case to the second electrode 35A of the integrated main capacitor 35, so that the second electrodes 31A and 32A are also connected in an electrically conducting manner to the contact 20 connected to the second electrode 35A.

It will be explained in the following description with which simple means a restriction of the tolerance range of the integrated main capacitor 35 is achieved, while the resonance frequency of the parallel resonant circuit is exactly fixed.

The method described hereinafter is defined by the characteristic features of the invention.

In the manufacture of a module 2 or a data carrier 1, an integrated circuit 3 is used for realizing, for example, a module 2, while using a metal lead frame, the module 2 having two terminals 10 and 15.

The nominal capacitance $C_{nom}$ of the integrated main capacitor 35 of the integrated circuit 3 is assumed to be desirable with $C_{nom}$=100 nF at the two contacts 20 and 25 of the integrated circuit 3.

The manufacture-defined tolerance range of the capacitance is assumed to be TB=±10%. The effective capacitance of the integrated main capacitance 35 can therefore be written as follows:

$$C_{eff}=C_{nom} \pm 10\% \tag{1}$$

This means that, when no special measures are taken, the effective capacitance between an upper limit value $C_{eff}^{OG}$= 110 nF and a lower limit value $C_{eff}^{UG}$=90 nF is present at the two contacts 20 and 25 and the two module terminals 10 and 15, respectively.

It is further assumed that the actual integrated main capacitor 35 of the integrated circuit 3 has a capacitance which is reduced by a factor F with respect to the effective capacitance. It is assumed for example that F=0.95. A new effective capacitance is then obtained:

$$C_{eff}^{*}=C_{eff} \cdot F=C_{eff} \cdot 0,95 \tag{2}$$

Taking the manufacture-defined tolerance of the capacitance with TB=±10% into account, it therefore holds that $$C_{eff}^{*}=C_{nom}{}_{-14,5\%}^{+4,5\%} \tag{3}$$

In other words, this means that in the case of a measurement of the capacitance of the integrated main capacitor 35, a fluctuation of the effective capacitance between an upper limit value $C_{eff}^{*OG}$=104.5 nF and a lower limit value $C_{eff}^{*UG}$=85.5 nF at the two contacts 20 and 25 is to be taken into account.

During manufacture of the module 2 and the data carrier 1, the capacitance of the integrated main capacitor 35 is measured. When this capacitance at the two contacts 20 and 25 falls below a threshold value CS of the capacitance, the first electrode 32B of the first additional capacitor 32 is connected in an electrically conducting manner from the additional terminal 24 of the integrated circuit to the second module terminal 15 via an electrically conducting connection 44. Since the second electrode 32A of the first additional capacitor 32 is internally connected to the integrated main capacitor 35, a parallel arrangement of the integrated main capacitor 35 with the first additional capacitor 32 is provided. The first additional capacitor 32 has a fraction of the nominal capacitance of the integrated main capacitor 35. For example, it is assumed that the first additional capacitor 32 has a value $\Delta C_1$, namely $$\Delta C_1 = C_{nom} \cdot 0,1 = 100 \text{ nF} \cdot 0,1 = 10 \text{ nF}.$$

Under these conditions assumed in this connection, a new, lower limit value of $$C_{eff}^{*UG} = 85,5 \text{ nF} + 10 \text{ nF} = 95,5 \text{ nF}$$

is obtained instead of the limit value of 85.5 nF previously determined in the measurement. The threshold value CS is fixed at, for example, CS=94.5 nF.

Finally, it generally holds that the reduction of the capacitance of the integrated main capacitor 35 by a factor F(0<F<1) with respect to the nominal capacitance of the integrated main capacitor 35 leads to a restriction of the upper tolerance range and to an extension of the lower tolerance range. Due to the parallel arrangement of an additional capacitor, whose capacitance $\Delta C$ is a fraction K of the nominal capacitance of the integrated main capacitor 35, a restriction of the lower tolerance range is achieved, if necessary. In the elucidated example it has been achieved on the basis of the described procedure that the effective capacitance at the two module terminals 10 and 15 has a tolerance range of only ±4.5%, namely due to the optional parallel arrangement of the first additional capacitor 32 in dependence upon whether the measured capacitance exceeds or falls below the fixed threshold value CS.

The following relations for parallel arrangement of an additional capacitor are given below by way of example $$C_{eff}^{*}=(C_{nom} \pm n\%) \cdot F \tag{4}$$

$$\Delta C = C_{nom} \cdot K \tag{5}$$

$$F = \frac{(G+100)}{(100+n)} \quad (6)$$

$$K = \frac{n \cdot F}{100} - \frac{G}{100} - F + 1 \quad (7)$$

In these relations, G represents the desired tolerance range (in %) and n represents the manufacture-defined tolerance range (in %). G may be suitably selected between the upper limit n and a lower limit $G_{UG}$, in which it holds, for example, for $G_{UG}$ $$G_{UG} = \frac{100 \cdot n}{200 + n} \quad (8)$$

The following relation holds for the threshold value CS $$CS = C_{\mathit{eff}} *^{OG} - \Delta C \quad (9)$$

It should be noted that, similarly as the main capacitor, an additional capacitor may have a manufacture-defined tolerance which should consequently be taken into account.

It will be evident to those skilled in the art that a refinement can be achieved for an envisaged restricted tolerance range by not only using the first additional capacitor 32 but a plurality of additional capacitors, for example, also the last additional capacitor 31. Analogously to the procedure described hereinbefore, a plurality of additional capacitors can thus be added by optional parallel arrangement with the integrated main capacitor 35, as is indicated by means of an electrically conducting connection 46 denoted by a dot-and-dash line in FIG. 1. The capacitances ΔC of the additional capacitors are chosen to be differently large so that suitable selection of the most favorable values of additional capacitors leads to an optimal overall capacitance so that optimal conditions for a satisfactory transmission behavior can be achieved.

The data carrier 1 shown in FIG. 2 is a modification of the data carrier 1 shown in FIG. 1, in which also additional capacitors 31 and 32 are provided but whose second electrodes 31A and 32A are not connected internally to the second electrode 35A of the integrated main capacitor 35 but to two separate additional contacts 21 and 22 of the integrated circuit 3.

What is claimed is:

1. A data carrier comprising
a coil with two coil terminals and
an integrated circuit,
said integrated circuit comprising
an integrated main capacitor which is connected to two contacts of the integrated circuit,
each contact of said two contacts being connected in an electrically conducting manner to a coil terminal via an electrically conducting connection,
the integrated circuit also comprising
at least one integrated additional capacitor which is connected to at least one additional contact of the integrated circuit,
each additional contact of said at least one additional contact being connected in an electrically conducting manner to a coil terminal via an electrically conducting connection.

2. A data carrier as claimed in claim 1, wherein
the integrated circuit comprises
a plurality of integrated additional capacitors which are connected to a plurality of additional contacts of the integrated circuit,
each additional contact of said plurality of additional contacts being connected in an electrically conducting manner to a coil terminal via an electrically conducting connection.

3. A data carrier as claimed in claim 1, wherein
the integrated circuit comprises
a plurality of integrated additional capacitors and
each additional capacitor comprises only one additional contact, and
wherein
a first electrode of each additional capacitor is connected to an additional contact, and
a second electrode of each additional capacitor is connected internally in the integrated circuit to the integrated main capacitor.

4. A module comprising
coil terminals to which a coil is connectable,
which module comprises
an integrated circuit,
said integrated circuit comprising
an integrated main capacitor which is connected to two contacts of the integrated circuit,
each contact of said two contacts being connected in an electrically conducting manner to a coil terminal via an electrically conducting connection,
the integrated circuit also comprising
at least one integrated additional capacitor which is connected to at least one additional contact of the integrated circuit,
each additional contact of said at least one additional contact being connectable in an electrically conducting manner to a coil terminal via an electrically conducting connection.

5. A module as claimed in claim 4, wherein
the integrated circuit comprises
a plurality of integrated additional capacitors which are connected to a plurality of additional contacts of the integrated circuit,
each additional contact of said plurality of additional contacts being connectable in an electrically conducting manner to a coil terminal via an electrically conducting connection.

6. A module as claimed in claim 4, wherein
the integrated circuit comprises
a plurality of integrated additional capacitors and
each additional capacitor comprises only one additional contact, and
wherein
a first electrode of each additional capacitor is connected to an additional contact, and
a second electrode of each additional capacitor is connected internally in the integrated circuit to the integrated main capacitor.

7. An integrated circuit for a data carrier comprising
a coil with two coil terminals and
an integrated circuit,
said integrated circuit comprising
an integrated main capacitor which is connected to two contacts of the integrated circuit,
each contact of said two contacts being connected in an electrically conducting manner to a coil terminal via an electrically conducting connection,
the integrated circuit also comprising
at least one integrated additional capacitor which is connected to at least one additional contact of the integrated circuit, each additional contact of said at least one additional contact being connectable in an electrically conducting manner to a coil terminal via an electrically conducting connection.

8. An integrated circuit as claimed in claim 7, wherein the integrated circuit comprises
a plurality of integrated additional capacitors which are connected to a plurality of additional contacts of the integrated circuit,
each additional contact of said plurality of additional contacts being connectable in an electrically conducting manner to a coil terminal via an electrically conducting connection.

9. An integrated circuit as claimed in claim 7, wherein the integrated circuit comprises
a plurality of integrated additional capacitors and
each additional capacitor comprises only one additional contact, and
wherein
a first electrode of each additional capacitor is connected to an additional contact, and wherein
a second electrode of each additional capacitor is connected internally in the integrated circuit to the integrated main capacitor.

* * * * *